US 8,533,360 B2

(12) United States Patent
Chandrachood et al.

(10) Patent No.: US 8,533,360 B2
(45) Date of Patent: Sep. 10, 2013

(54) METHOD AND APPARATUS TO REPORT RESOURCE VALUES IN A MOBILE NETWORK

(75) Inventors: Santosh Chandrachood, Milpitas, CA (US); Hei Tao Fung, Freemont, CA (US)

(73) Assignee: WiChorus, Inc., Santa Clara, CA (US)

( * ) Notice: Subject to any disclaimer, the term of this patent is extended or adjusted under 35 U.S.C. 154(b) by 220 days.

(21) Appl. No.: 12/900,338

(22) Filed: Oct. 7, 2010

(65) Prior Publication Data

US 2011/0087798 A1 Apr. 14, 2011

Related U.S. Application Data

(60) Provisional application No. 61/278,520, filed on Oct. 7, 2009.

(51) Int. Cl.
*G06F 15/16* (2006.01)
(52) U.S. Cl.
USPC ........... 709/240; 709/200; 709/226; 709/234; 370/352; 370/216; 370/230; 370/229; 370/252; 726/3; 726/4; 726/22; 726/24
(58) Field of Classification Search
USPC ................................. 709/234, 330
See application file for complete search history.

(56) References Cited

U.S. PATENT DOCUMENTS

| | | | |
|---|---|---|---|
| 6,707,826 B1 | 3/2004 | Gorday et al. | |
| 7,065,083 B1 | 6/2006 | Oren et al. | |
| 7,076,551 B2 * | 7/2006 | Gary | 709/226 |
| 7,277,948 B2 | 10/2007 | Igarashi et al. | |
| 7,657,706 B2 | 2/2010 | Iyer et al. | |
| 7,706,291 B2 | 4/2010 | Luft et al. | |
| 7,719,995 B2 | 5/2010 | Luft | |
| 7,733,891 B2 | 6/2010 | Reynolds et al. | |
| 7,773,510 B2 | 8/2010 | Back et al. | |
| 8,018,955 B2 | 9/2011 | Agarwal et al. | |
| 8,111,705 B1 | 2/2012 | Bartlett et al. | |

(Continued)

FOREIGN PATENT DOCUMENTS

WO WO 2011/044396 4/2011

OTHER PUBLICATIONS

Notification of Transmittal of the International Search Report and Written Opinion of the International Searching Authority; International Application No. PCT/US2010/051874, Date of Mailing: Jun. 30, 2011.

(Continued)

*Primary Examiner* — Jude Jean Gilles
(74) *Attorney, Agent, or Firm* — Hamilton, Brook, Smith & Reynolds, P.C.

(57) ABSTRACT

In current systems, a typical way to collect application statistics includes sending requests to a resource manager that can access the resource hardware via a device driver. Current systems require multiple synchronous transactions between the processes, which results in the systems consuming large amounts of central processing unit resources that lead to sub-optimal rates of information retrieval. A method and apparatus configured to use asynchronous messaging across all modules and to return hardware statistics directly from the hardware to an application process, thereby bypassing transactions between the application and the resource manager, and bypassing similar transactions between the resource manager and a device driver. Embodiments of the invention are provided for minimizing the power consumed by the memory and minimizing the amount of dedicated memory necessary to perform.

40 Claims, 7 Drawing Sheets

(56) References Cited

U.S. PATENT DOCUMENTS

| | | |
|---|---|---|
| 8,111,707 B2 | 2/2012 | Riddle et al. |
| 8,284,786 B2 | 10/2012 | Mirandette et al. |
| 8,381,264 B1 | 2/2013 | Corddry et al. |
| 2001/0049753 A1* | 12/2001 | Gary .................... 709/330 |
| 2005/0050136 A1* | 3/2005 | Golla .................... 709/200 |
| 2008/0013470 A1 | 1/2008 | Kopplin |
| 2008/0137646 A1 | 6/2008 | Agarwal et al. |
| 2008/0155101 A1* | 6/2008 | Welsh et al. ........... 709/226 |
| 2008/0274729 A1 | 11/2008 | Kim et al. |
| 2009/0012927 A1 | 1/2009 | Brooks et al. |
| 2009/0086651 A1 | 4/2009 | Luft et al. |
| 2009/0116513 A1 | 5/2009 | Gray et al. |
| 2009/0285225 A1 | 11/2009 | Dahod |
| 2010/0191839 A1 | 7/2010 | Gandhewar et al. |
| 2010/0192207 A1 | 7/2010 | Raleigh |
| 2010/0229192 A1 | 9/2010 | Marilly et al. |
| 2011/0021236 A1 | 1/2011 | Dinan et al. |
| 2011/0080886 A1 | 4/2011 | Chandrachood et al. |
| 2011/0085439 A1 | 4/2011 | Chandrachood et al. |
| 2011/0085571 A1 | 4/2011 | Chandrachood |
| 2011/0087786 A1 | 4/2011 | Chandrachood et al. |

OTHER PUBLICATIONS

International Preliminary Report on Patentability; International Application No. PCT/US2010/051874 Date of Mailing: Apr. 19, 2012.

* cited by examiner

METHOD AND APPARATUS TO REPORT RESOURCE VALUES IN A MOBILE NETWORK

RELATED APPLICATION

This application claims the benefit of U.S. Provisional Application No. 61/278,520, filed on Oct. 7, 2009, the entire teachings of which are incorporated herein by reference.

BACKGROUND OF THE INVENTION

In subscriber aware networks, such as Worldwide Interoperability for Microwave Access (WiMax) networks, High Speed Packet Access (HSPA) networks, $3^{rd}$ Generation Partnership Project Long Term Evolution (3GPP LTE) networks etc. Billing servers or accounting servers may be used to track activities on a per-subscriber basis, such as for billing subscribers for their respective wireless calling minutes.

SUMMARY OF THE INVENTION

Embodiments of the present invention include methods, apparatuses, and computer program products for reporting resource values in a mobile network. An example embodiment of the present invention includes, for example, an apparatus, sometimes referred to herein as a functional element, in a mobile network node that employs modules configured to report resources as may be necessary. Specifically, a first module, a notification module, is configured to notify a resource manager of a buffer that contains subscriber information. A second module, a buffer fill module, is configured to fill a buffer with a pointer to resources in the network and is further configured to be interconnected operably to a replacement module, which replaces the resource pointer with a corresponding resource value. A reporting module reports the filled buffer.

According to another example embodiment, there can be a second apparatus for reporting resource values in a data plane of a mobile network. The apparatus can include a module configured to fill a buffer with information pertaining to subscribers in a mobile network, including the services corresponding to each of the subscribers and the resource values corresponding to each of the services. The second apparatus further includes a module configured to report the buffer.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

A description of example embodiments of the invention follows.

A typical approach to collect application statistics is to send requests to a resource manager in a control plane that can access resource hardware via a device driver, where the resource hardware, such as a counter, keeps track of activity occurring in a data plane. The resource manager and device driver may both be located in a central processing unit (CPU). In the typical approach, an application sends a synchronous read message to the resource manager. Following receipt of the synchronous read message, the resource manager sends a synchronous message to the driver, causing the device driver to read statistics from the hardware. Throughout the process, multiple synchronous transactions or messages are exchanged, meaning the resource manager waits for requested information from the driver or intermediate modules, and the device driver waits for its response from the hardware, and, while waiting, the resource manager, intermediate modules (if any), and device driver perform no other activities. Synchronous operations are fine for small volumes of subscribers, but as subscribers increase in number, such as with the advent of 4G wireless networks, the synchronous approach will be inefficient and result in consuming large amounts of CPU resources, which can produce a sub-optimal rate of information retrieval.

In the case of maintaining counters in line cards in a network gateway, for example, and having internal retrieval activities in the same line card, current methods begin with an application's sending a synchronous message to a resource manager, the resource manager's responsively sending a synchronous message to the device driver, the device driver sending a synchronous message to the hardware resource, the hardware resource responding in kind to the driver, the driver's responding in kind to the resource manager, and the resource manager responding in kind to the application. Similarly, current methods for processes across line cards include two additional synchronous messages: one synchronous message sent from the application on a first card to the application on a second card in order to begin the process, and a second synchronous message sent from the application on the second card to the application on the first card in order to end the process.

Embodiments of the present invention can allow for the use of asynchronous messaging across all modules and returning hardware statistics, such as statistics from counters, directly from the hardware to an application process. Therefore, an embodiment of the present invention has an ability to bypass transactions between the application and the resource manager, and to bypass similar transactions between the resource manager and device driver. Alternatively, example embodiments of the present invention can be applied to bypassing transactions between cards, thereby removing cross-card synchronous communication. It should be understood that at least two levels of efficiency are achieved first, asynchronous activities enable requesting modules, such as the resource manager, to conduct other activities or release its resources back to its host CPU, and second, bypassing transactions can use fewer control plane resources, and possibly no control plane resources in cases when return of the information from the hardware device is reported back to the requesting application via the data plane absent any control plane interaction.

A further optimization of alternative example embodiments of the present invention includes sending a command to return a "bulk of operations to hardware" and retrieve them in a single pass of messaging across these processes. This example embodiment may lower inter-process communications (IPCs) significantly, eliminate synchronous calls, and significantly increase speed of retrieval.

Additional alternative example embodiments of the invention include any or all of the modules being configured to operate in an asynchronous manner relative to the activities of the resource manager, and further can include any of the modules configured to operate at a data plane of a network functional element or multiple combinations of the modules configured to operate at both the data plane and the control plane of the network functional element.

Alternatively, example embodiments of the present invention can include a buffer being filled with information regarding subscribers in the mobile network, where information can include representations and indications of the subscribers, subscribers' corresponding provisioned services, resource values corresponding to the provisioned services, or other representative subscriber information as may commonly employed or hereafter developed. In example embodiments with modules included on the network functional element, as well as external functional elements or devices, the modules may receive the buffer via transmission of the buffer in the form of a traffic-packet, or, alternatively, the modules may receive a pointer to the buffer. Any of the modules being interconnected operably to one another or other network elements and configured to perform operations such that statistics relevant to a subscriber or set of subscribers in the mobile network may be available to applications external to the functional element.

Embodiments of the present invention provide various technical advantages of conventional methods and apparatuses for reporting resources in a network node. Some of these technical advantages are shown and described in the description of the present invention. Certain embodiments of the present invention may enjoy some, all, or none of these advantages. Other technical advantages may be readily apparent to those skilled in the art from the following figures, description, and claims.

Figure 1:
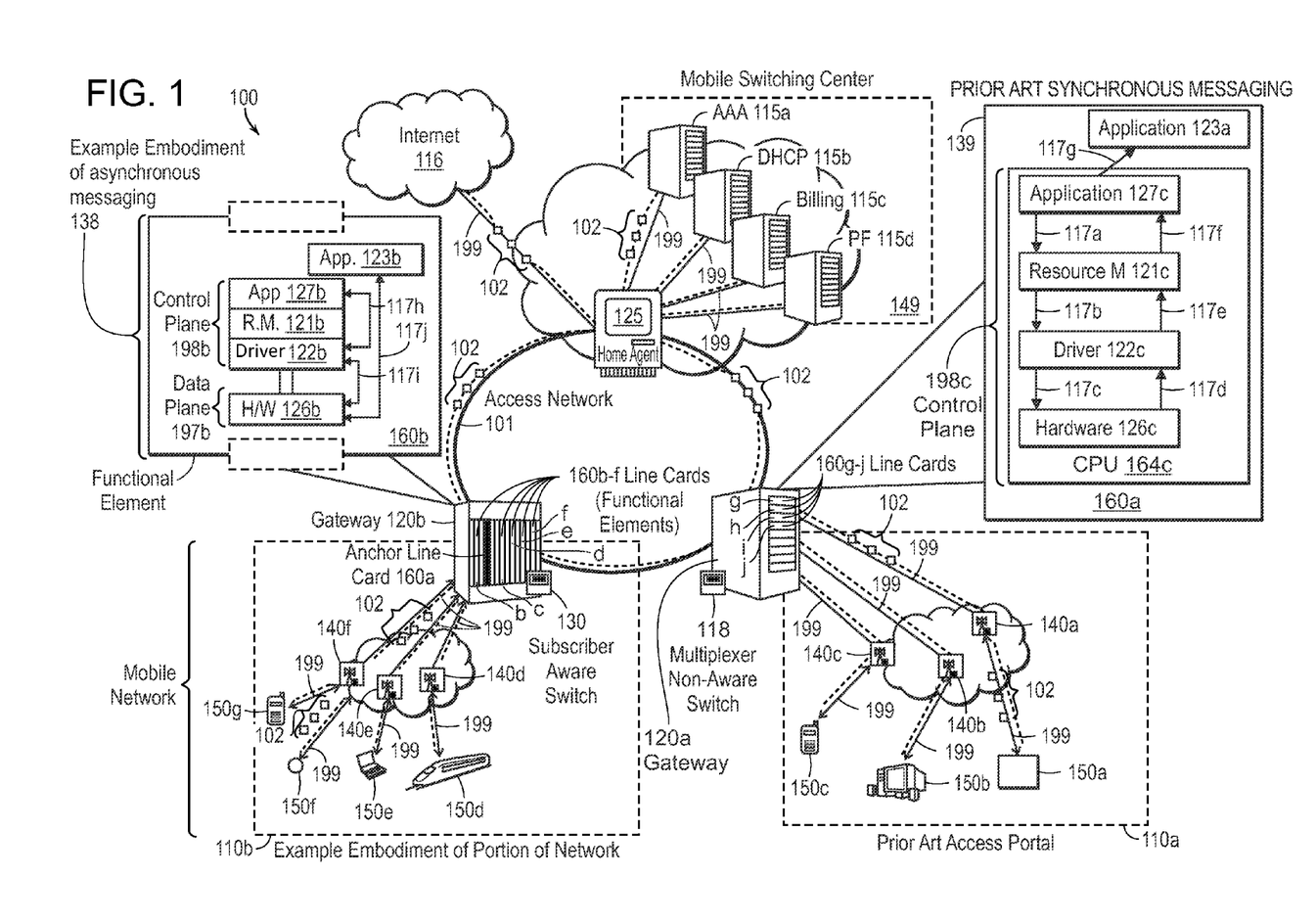
FIG. 1 is a network diagram of a prior art access portal and an embodiment of the present invention that illustrates functional elements operably interconnected via wireline or wireless mediums.

FIG. 1 is a network diagram of a network 100 illustrating aspects of an example embodiment of the invention. The network 100 can be any type of network configured to enable wireless access, such as a wide area network (WAN) having wireless access thereto, wireless broadband network employing a Worldwide Interoperability for Microwave Access (WiMax) network, High Speed Packet Access (HSPA) network, $3^{rd}$ (or $4^{th}$) Generation Partnership Project Long Term Evolution (GPP LTE) network, or other commonly employed or hereafter-developed network. The network 100 can include at least one access network 101, to interconnect operably with a number of network elements, and may include, for example, mobile end user devices (hereinafter "subscriber devices") 150a-g.

The access network 101 can connect basic network elements such as a mobility management entity (MME) (not shown), home location register (HLR) (not shown), home agent 125, gateways 120a-b, or other known network elements. The access network 101 connects to at least one base transceiver station 140a-f, either directly or through additional networks, such as an edge network (not shown), which connects mobile devices 150a-g via a telecommunications interface 199 or wireless medium, e.g., an air interface. The home agent 125 further connects the wireless network 135 to external networks, e.g., the Internet 116 or a mobile switching center 149 containing service portals 115a-d. The service portals 115a-d can provide support for multiple service types through use of, for example, an authentication, authorization, and accounting (AAA) server 115a, dynamic host configuration protocol (DHCP) server 115b, billing server 115c, home policy function (PF) server 115d, or other type of portal that may be used at the mobile switching center 149. The AAA server 115a may provide authentication services to validate a subscriber, authorization to determine the subscriber's rights, and accounting to determine subscriber's usage. The DHCP server 115b may provide for address allocation services in a manual, automatic, or dynamic manner, or as otherwise provided by a network administrator. The home PF server 115d may provide general policy rules or application dependent policy rules. The home PF server 115d may also evaluate network requests against the policies and may be associated with a home policy database, which may be associated with a network service processor (NSP) 162.

Continuing to refer to FIG. 1, traffic 102, originating at a mobile device such as a portable computer mobile device 150a, may travel toward its respective base station 140a via a wireless medium 199. The base stations 140a may, in turn, forward the traffic 102 to a corresponding gateway 120a via a wired or wireless medium 199. The gateway 120a can be any of a multitude of wireless gateways, such as an Access Signaling Node Gateway (ASN-GN), Gateway GPRS Support Node (GGSN), Serving General Packet Radio Service Support Node (SGSN), System Architecture Evolution (SAE) gateway, or other currently known or hereafter-developed gateway. In the example network 100, the gateway 120b contains at least one functional element 160a, such as a line card, that supports traffic packets, or other traffic signals, at traffic rates; multiple line cards in a chassis 160b-f can also be present.

An example embodiment of the present invention includes a subscriber-aware switch, such as switch 130 in FIG. 1, directs traffic from a subscriber to the specific line card where the subscriber's profile is maintained; for example, the switch can be configured to determine a subscriber profile associated with the communications traffic 102. Details of a subscriber-aware switch are described further in Applicants' pending U.S. patent application Ser. No. 12/900,354 being filed concurrently herewith, entitled "Method and Apparatus for Switching Communications Traffic in a Communications Network" by Santosh Chandrachood and Pawan Uberoy, which claims priority to Applicants' U.S. Provisional Patent Application No. 61/278,496, filed Oct. 7, 2009, entitled "A Method and Apparatus for Subscriber Distribution and Load Balancing Using Mid-Plane Design in a Subscriber Aware Platform Such as ASN Gateway, GGSN, SGSN etc." by Chandrachood et al., the entire teachings of both applications being incorporated herein by reference in their entirety. The switch 130 is a subscriber-aware switch and has knowledge of the subscriber's profile location, whereas previous switches are non-subscriber-aware switches, for example, such as a multiplexer switch 118, which merely switch traffic without being aware of the traffic's destination.

In an example of a prior art access portal 110a, the portion of the network includes similar elements and components as the network 100, including, for example, subscriber devices 150a-c connected to base stations 140a-c via a wireless medium 199. The base stations 140a-c are similarly connected to a gateway node 120a via mediums 199. The gateway 120a may include a multiplexer switch 118, which simply forwards traffic signals from an input to an output based on header information, and may include a line card 160g (or multiple line cards 160g-i) for processing functions. However, the prior art example embodiments rely on synchronous resource reporting, where the messages execute sequentially; while one entity is waiting for a response from a second entity, the execution process is suspended. The synchronous messaging system of the prior art example requires more wait time as the number of messages sent increase, thereby increasing run time and resources.

For example, in reference to the blown-out prior art synchronous messaging 139, referencing a line card 160g, a synchronous-messaging example is illustrated. In order to provide resource statistics to application 123c, elements of the line card 160g must perform a series of synchronous messages. The synchronous messaging series occurs in a control plane 198c (i.e., a slow path) and includes communications between a sub-application 127c, resource manager 121c, driver 122c, hardware 126c, and application 123c. Synchronous messaging here is communication between these processes, which is un-buffered and requires each process to wait until the data or message between the two processes has been transferred or completed. Throughout the entire process of reporting statistics to the application 123c, multiple synchronous messages or transactions are sent between each pair of processes cause inefficient results, consume large amounts of CPU resources, and produce sub-optimal rate of retrieval.

In the example embodiment of the prior art synchronous messaging, the sub-application 127c sends a synchronous message 117a to the resource manager 121c requesting hardware statistics; before the resources manager can send a message to the driver 122c, the resource manager 121c must give a response to the sub-application 127c first. This pattern, of request message/response message pertains to all processes. In other words, the resource manager 121c sends a synchronous message 117b to the driver 122c, which responds and then sends a synchronous message 117c to the hardware 126c, which responds. In order for the statistics to be reported to the application 123c, the processes must reverse order and send the information upwards. In other words, the hardware 126c sends a synchronous message 117d to the driver 122c, which responds and sends a synchronous message 117e to the resource manager 121c. The resource manager 121c responds to the driver 122c and sends a synchronous message 117f to the sub-application 127c, which responds. After all of these synchronous processes complete, the sub-application 127c can send a synchronous message 117g to the application 123c, which can include the statistical reports.

Example embodiments of the present invention can include asynchronous messaging and fast-path forwarding using a data plane. Resource management employing asynchronous messaging systems do not require response return, and, therefore, allow for scalable resource allocation and messaging without information loss. In an example embodiment of the present invention, large numbers of subscribers can be assigned to one or more hardware counters on the network 100 per subscriber. Details of a method for assigning resources are described further in Applicants' pending U.S. patent application Ser. No. 12/900,243 being filed concurrently herewith, entitled "Method and Apparatus for Assigning Resources in a Network Node" by Santosh Chandrachood, which claims priority to Applicants' U.S. Provisional Patent Application No. 61/278,486, filed Oct. 7, 2009, entitled "A Method and Apparatus to Allocate Network Processing Unit Resources Dynamically in Fast Path Without Host CPU Involvement and Without Statically Holding Up Resources" by Chandrachood, the entire teachings of both applications being incorporated herein by reference in their entirety.

In order to report statistics about the counters, the hardware counters can be polled periodically and report the subscriber-hardware statistics using asynchronous messaging in a data plane 197b, or in the data plane 197b and a control plane 198b. An example embodiment of a function element 160b is illustrated in the blown out example embodiment of asynchronous messaging 138.

The functional element 160b, which can be a line card or a line card designated as an anchor line card (e.g., 160a) that includes a subscriber's profile. The functional element 160b includes a control plane 198b, which is a slow path and a data plane 197b, which is a fast path. The control plane 198b can contain a sub-application 127b, resource manager 121b, and driver 122b. The data plane 197b can contain hardware 126b. In an example embodiment of the present invention, the sub-application 127b can send an asynchronous message 117h to the driver 122b, which can immediately send an asynchronous message 117i to the hardware 126b. The hardware 126b can immediately, from the data plane, send an asynchronous message to the application 123b in a fast-path 117j, from the data plane 197b to the application 123b without going through the control plane 198b. Additional example embodiments are explained in reference to FIG. 2A.

Figure 2A:
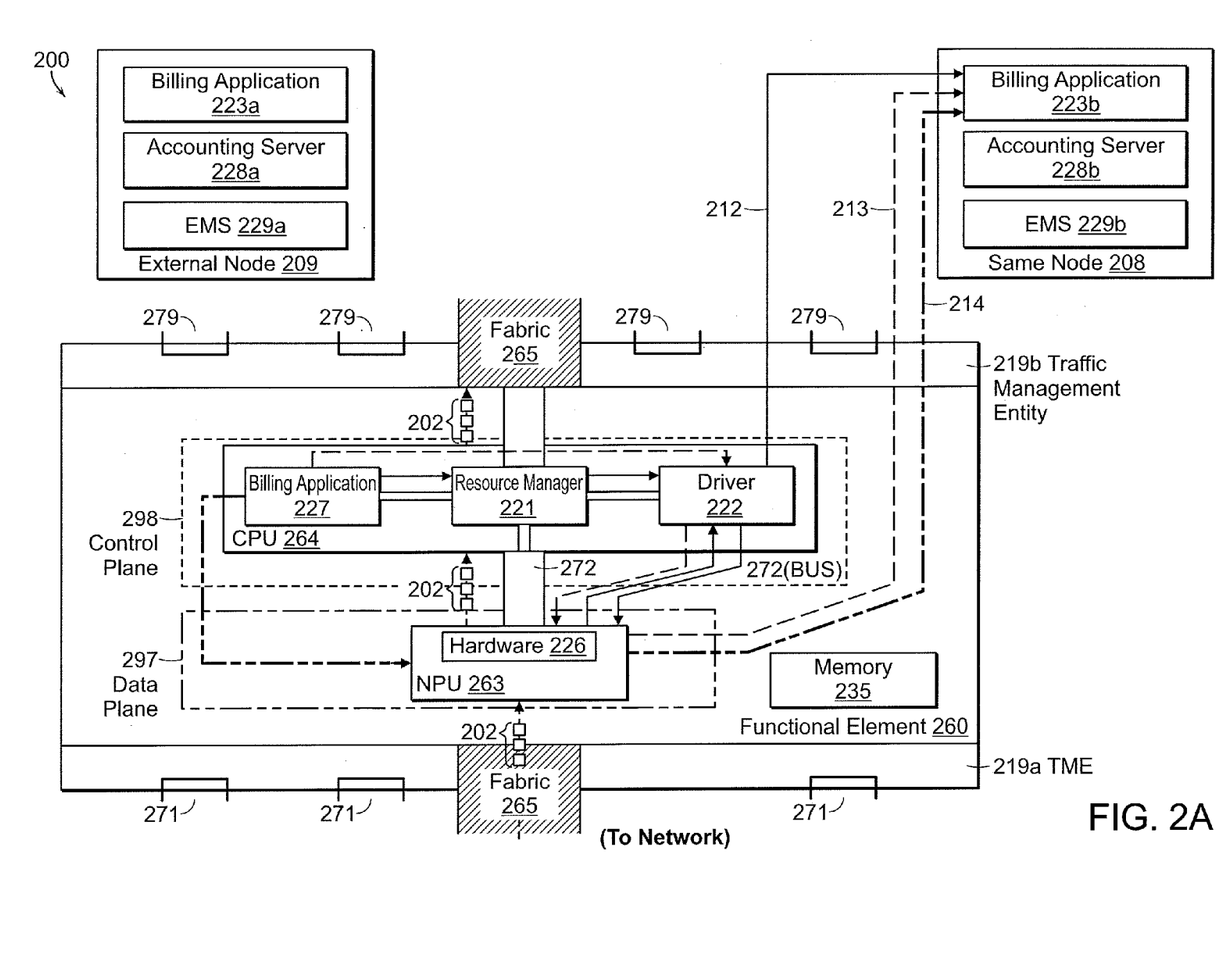
FIG. 2A is a block diagram of an embodiment of the invention that illustrates features of a functional element involved in reporting hardware resources at a data plane and at a control plane.

FIG. 2A is a block diagram 200a illustrating a functional element 260, such as a network node, for reporting resources using a data plane 297 and a control plane 298. The functional element 260 can be a single line card at a network node, or be a line card among a plurality of line cards in chassis at a network node. The functional element 260 can include a network processing unit (NPU) 263, which can be located on the data plane 297, or forwarding plane, of the functional element 260. The NPU 263, operating in the data plane 297, can include, for example, a hardware component 226. The CPU 264, operating in the control plane 298, can include, for example, a billing sub-application 227, a resource manager 221, or a driver 222. An application programming interface (API) (not shown) implemented by components of a software system, such as an operating system, an application, or a system library, being tied in a logical or physical configuration to the billing applications 223a-b for interacting with the billing sub-application 227.

The NPU 263 is interconnected operably to the functional element 260 via a fabric 265. The fabric 265 further can interconnect operably multiple functional elements (not shown) in a chassis. The NPU 263 can be interconnected operably to the CPU 264 via a peripheral component interconnect (PCI) bus 272, or other method of interconnecting or integrating circuitry, for example, a traffic rate bus that can be operating at traffic rates or multiples thereof. The CPU 264 can communicate with other nodes at the control plane 298 level via a control channel. The CPU 264 can control states of traffic modules, such as the NPU 263, operating at the data plane level via a CPU-to-NPU control channel. One or both of the NPU 263 and CPU 265 may be coupled to a memory 235, where the memory can be a ternary content addressable memory (TCAM) or other finite memory as may be known or hereafter developed.

The functional element 260 can include egress output ports 279 from which traffic can be sent to sub-elements within a same node 208 as the functional element 260 or to an external node 209. Both or either of the same node 208 and external node 209 can be a type of element in a network, such as the network 100 of FIG. 1, for example, the node can be a client, a server, a peer, or other network element commonly employed or hereafter developed. The same node 208 and the external node 209 may include, for example, a billing application 223a-b (e.g., billing server 115c in FIG. 1), an accounting server 228a-b, and an element management system (EMS) 229a-b. Alternatively, another example embodiment may include additional applications, management entities, servers, or other services commonly known or hereafter developed applicable to hardware resources.

In one example embodiment, a traffic packet 202 can enter the NPU 263 via the fabric 265 or via an ingress input port 271, the ingress input port 271 being decided based on packet header information, such as protocol information. The traffic packet 202 enters the hardware 226 of the NPU 263 located in the data plane 297. The control plane 298 receives the packet 202 from the data plane 297 via bus 272. The traffic packet 202 being associated with a subscriber (not shown), where the subscriber can be assigned to multiple hardware counters.

In one example embodiment of the present invention, a series of asynchronous messages 212 can be performed to report statistics to an application. The billing application 223b may require statistics or a network operator may program or decide hardware counter statistics to be reported to other network entities. The billing sub-application 227 can send an asynchronous message to the resource manager 221 in the control plane 298. Without waiting for a response, the resource manager 221 can send an asynchronous message to the driver 222, which can send an asynchronous message to the hardware 226, located in the data plane. The hardware 226 can return hardware resource statistics to the driver 222, which can report the hardware resource statistics to the billing application 223b using an asynchronous return message.

In an alternative example embodiment, a series of asynchronous messages 213 can be perform to report statistics to an application. The billing sub-application 227 can transmit an asynchronous message to the driver 222, which can, in turn, transmit an asynchronous message to the hardware 226 located at the data plane 297. The hardware 226, in the NPU 263 can directly report the hardware statistics from the data plane 297 to the billing application 223b, without return response to the control plane 298.

In yet another alternative example embodiment of the present invention, a series of asynchronous messages 214 can be performed to report statistics to an application. The billing sub-application 227 can send an asynchronous message to the hardware 326 directly, bypassing all processes in the control plane, thereby saving the CPU 264 resources and improving production of near-optimal or optimal rate of information retrieval. The hardware 226 reports the statistical results directly from the data plane to the billing application 223b.

In alternative example embodiments, an application on one card can acquire statistical results or information from hardware on another card, bypassing any inter-process communication or synchronous messaging. In yet another alternative example embodiment, an application can specify specific statistics relevant to a subscriber or set of subscribers, such that the relevant statistics can be acquired for all such subscribers with a single transaction and flow of process invocation without synchronous messaging. Further alternative example embodiments can include an application requesting a direct return delivery of statistical results from a device driver, without mediation of a resource manager process.

Alternatively, another example embodiment may include resource processes occurring between two line cards or across multiple line cards. In this example embodiment, the same series of asynchronous messages 212, 213, and 214 can occur between two line cards or across multiple line cards on the same or different network elements.

Figure 2B:
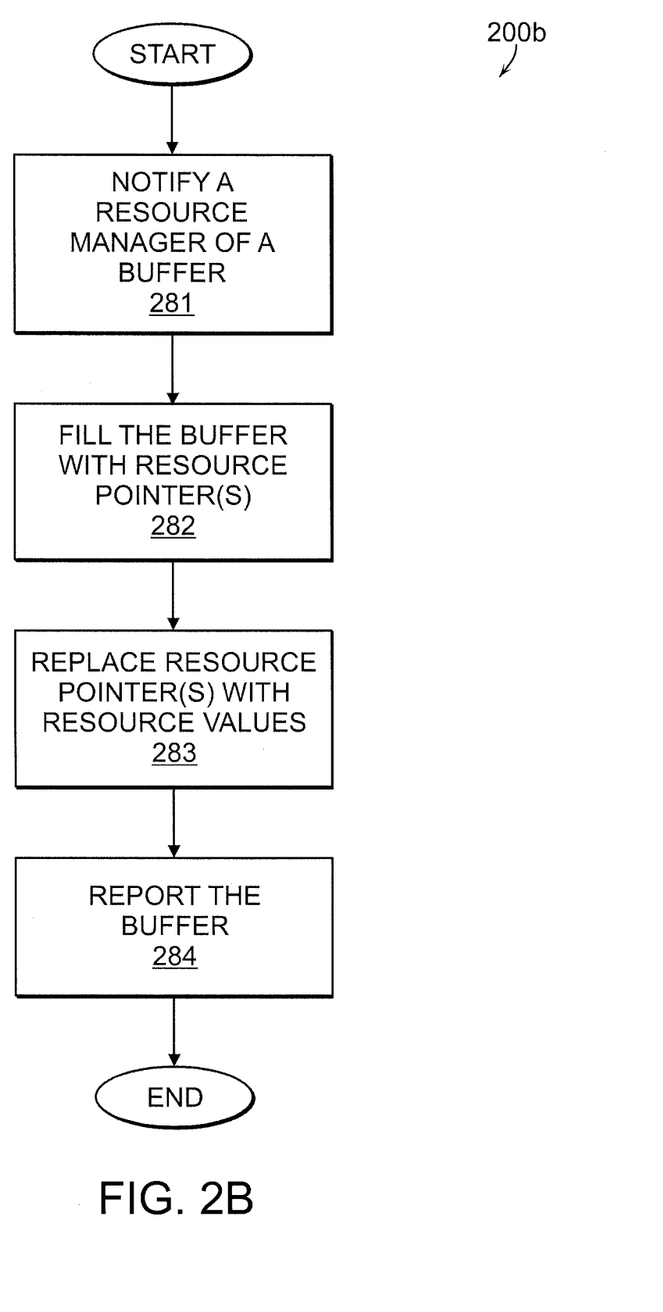
FIG. 2B is a flow chart of an embodiment of the present invention that illustrates functions involved in reporting resource values in mobile network.

FIG. 2B is a flow chart 200b illustrating a method by which a network element, such as the line card 160a of FIG. 1, can report resource values in a network according to an aspect of the present invention. According to the example embodiment, the flow chart 200b notifies a resource manager of a buffer that can contain subscriber information (281). The buffer containing subscriber information can be filled with resources pointers (282) and the resource pointers can be replaced with resource values corresponding to the resource pointers (383). Further, the example embodiment of flow chart 200b can report the buffer or buffer contents (284).

Figure 3A:
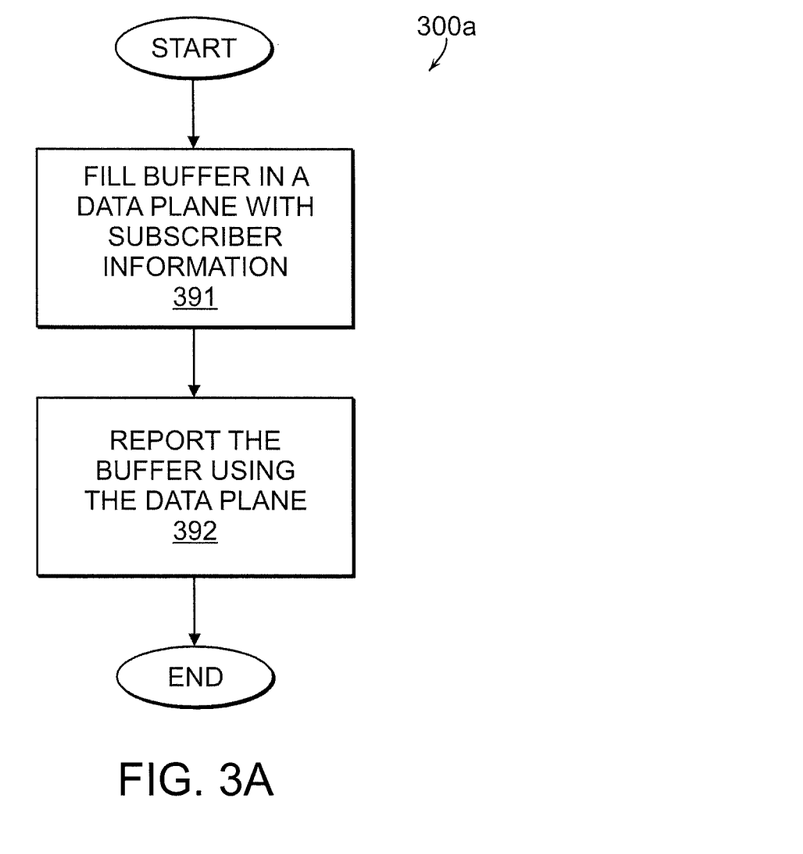
FIG. 3A is a flow chart of an embodiment of the present invention that illustrates functions involved in reporting resource values in a data plane.
Figure 4:
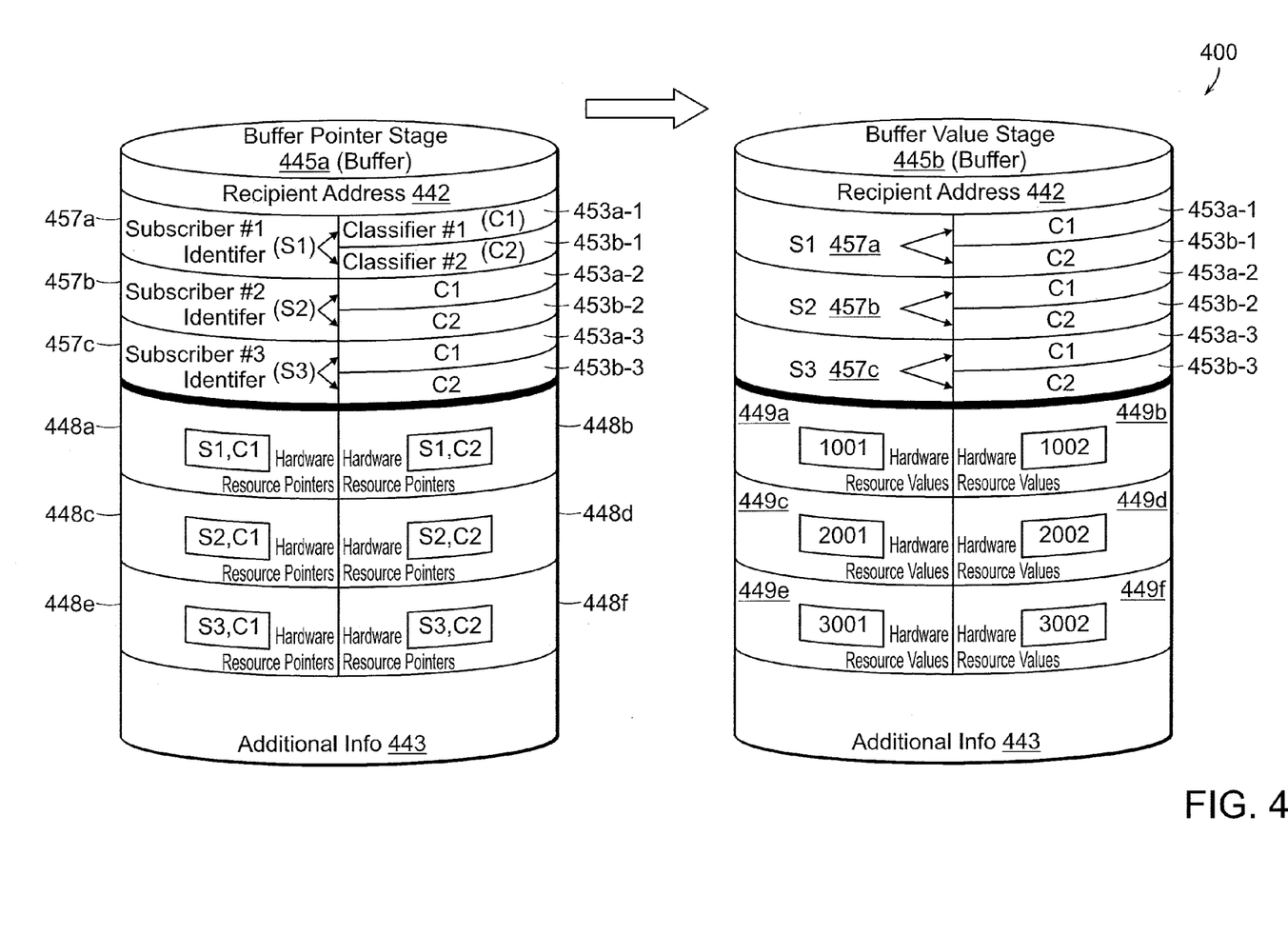
FIG. 4 is a logical diagram of a memory of an embodiment of the present invention that illustrates pointer stacks.

In alternative example embodiments, a buffer, such as the buffer 445b of FIG. 4, can be reported to an external node, such as the external node 309 of FIG. 3A, by transmitting the buffer or a portion of the buffer. Alternatively, another example embodiment can transmit the buffer to an element of the same node, such as the node 308 of FIG. 3A, by coping the buffer into a traffic packet without any modifications. The buffer can be reported to any node or network sub-element in the network by other methods commonly employed or hereafter developed.

Figure 2C:
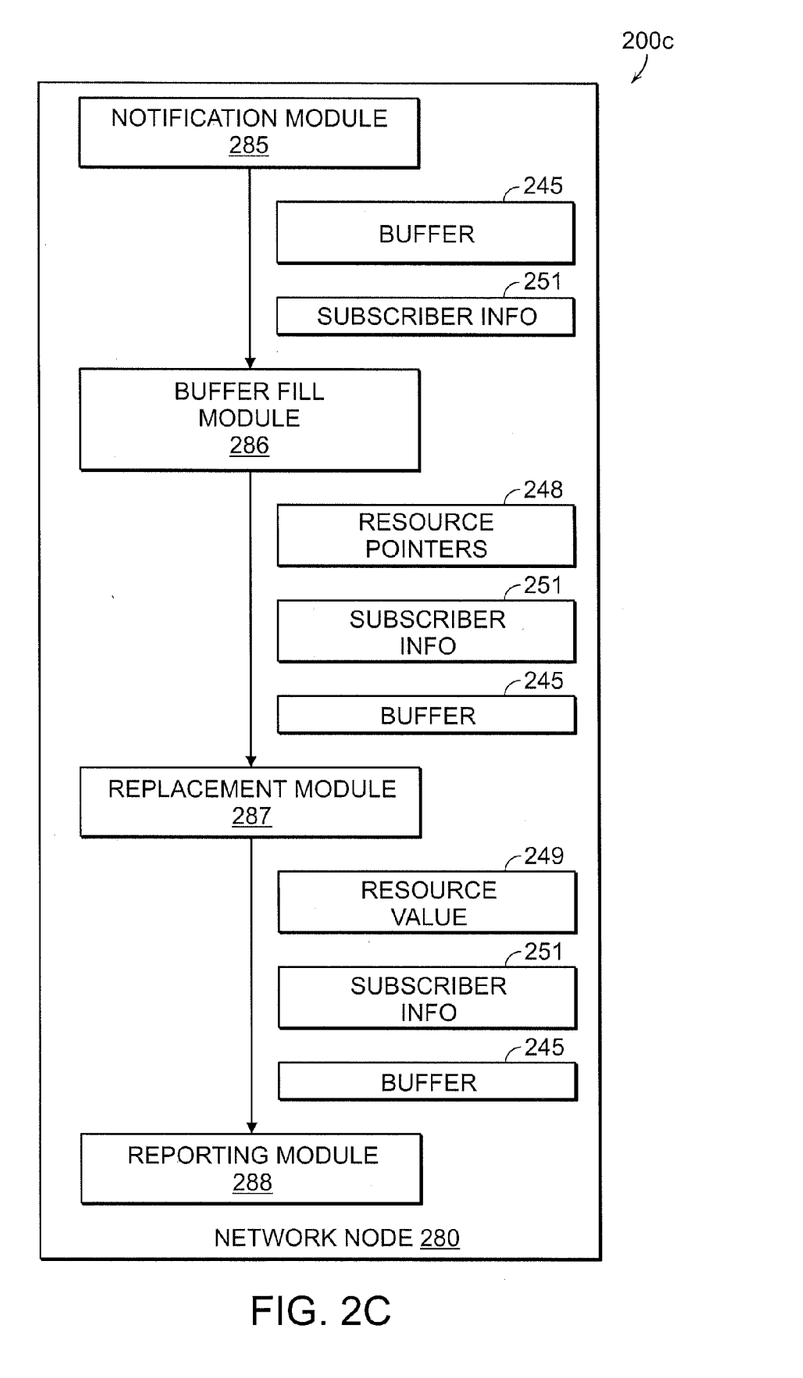
FIG. 2C is a block diagram of an embodiment of the invention that illustrates components involved in reporting hardware resources.

FIG. 2C is a block diagram 200c illustrating a network element, such as the network node 120a of FIG. 1, illustrating an example embodiment of the invention. The block diagram 200c includes a notification module 285, buffer fill module 286, replacement module 287, and reporting module 288. The notification module 285 can notifying a resource manager regarding a buffer 245, which can include subscriber information 251 or other information. The notification module 285 can pass a copy of the buffer or forward a pointer to the buffer to the buffer fill module 286; the buffer fill module 286 can fill the buffer 245 with resource pointers 248. The replacement module 287 can receive information from the buffer fill module 286, such as the resource pointers 248, subscriber information 251, or the buffer 245. The replacement module 287 can be configured to replace the resource pointers 248 with the resource values 249 corresponding to the resource pointers 248. The reporting module 288 can be configured to report the buffer 245; the reporting module 288 can receive a copy of the buffer 245 or a pointer 248 forwarded from the replacement module 287.

Alternatively, another example embodiment can include the reporting module 288 receiving a copy of the buffer 245 directly from a memory, such as the memory 235 of FIG. 2A. Another alternative example embodiment of the present invention can include, for example, the modules being in any configuration in system of any physical or logical configuration.

FIG. 3A is a flow chart 300a illustrating a method by which a network element 380, such as the line card 160a of FIG. 1, can report resource values in a data plane according to an example embodiment of the present invention. The example embodiment of flow chart 300a provides for a method of filling a memory, which can include a buffer such as the buffer 445a of FIG. 4, in a data plane with information regarding subscribers or subscriber devices present in a network, such as the mobile network 100 of FIG. 1 (391), and the buffer further being reported via a data plane of a mobile network or network entity (392).

In alternative example embodiments, the buffer can be reported to an external node, such as the external node 209 of FIG. 2A, by transmitting the buffer or a portion of the buffer. Alternatively, another example embodiment can transmit the buffer to an element of the same node, such as the node 208 of FIG. 2A, by coping the buffer into a traffic packet without any modifications to the buffer. The buffer can be reported to any node or network sub-element in the mobile network by other methods commonly employed or hereafter developed.

Figure 3B:
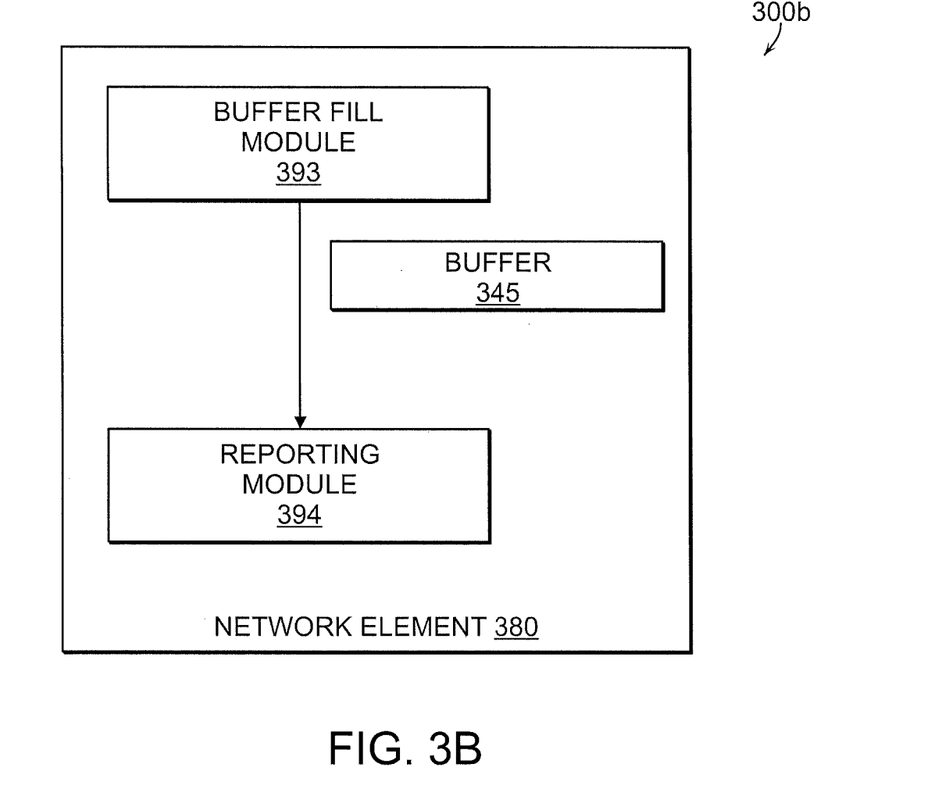
FIG. 3B is a block diagram of an embodiment of the present invention that illustrates components involved in reporting hardware resources in a data plane.

FIG. 3B is a block diagram 300b illustrating a network element 380, such as the line card 160a of FIG. 1, according to an example embodiment of the invention. Components of the network element 380 can include a buffer fill module 393 and a reporting module 394. The buffer fill module 393 can be configured to fill a buffer 345 with information representing subscribers, such as source or destination, subscribers' corresponding services, such as quality of service, and accounting or billing records of the subscribers. Details of allocation of services, such as quality of service, are described further in Applicants' pending U.S. patent application (Serial Number not yet assigned) being filed concurrently herewith, entitled "Method and Apparatus for Efficient Resource Allocation of Quality of Service Profiles in Mobile Networks" by Santosh Chandrachood and Henry Fung, which claims priority to Applicants' U.S. Provisional Patent Application No. 61/278,505, filed Oct. 7, 2009, entitled "A Method and Apparatus for Efficient Resource Allocation of Quality of Service Profiles in Mobile Networks" by Chandrachood et al., the entire teachings of both applications being incorporated herein by reference in their entirety. According to an example embodiment, the modules can be part of or all of a system to report resource values in a data plane of the network element. Alternatively, another example embodiment of the present invention can include, for example, the modules being in any configuration in system of any physical or logical configuration.

FIG. 4 is a logical diagram 400 illustrating a memory 435, such as buffers 445a-b, according to an example embodiment of the present invention. The buffers 445a-b can be a storage medium used, for example, to collect and stored data for use by a network element, such as network node 120b or FIG. 1; the buffers 445a-b can be used for other purposes commonly employed or hereafter developed, such as for interconnecting circuits operating at different rates or reading and writing information. In alternative example embodiments, the buffers 445a-b can be other types of memory, such as a queue, cache, or other commonly employed or hereafter developed type of memory or portion of memory. The buffers 445a and 445b can be the same buffer during different stages of a buffer fill procedure, such as the buffer fill procedure 281 of FIG. 2B. The buffer 445a can store subscriber information in general, including, for example, a recipient address 442, subscriber identifiers 457a-c, classifiers 453a-1-453a-3 and 453b-1-453b-3, hardware resource pointers 448a-f, or other information 443; the information stored in the buffer 445a can be rewritten, read, and otherwise reconfigured based on different information or processes in the network. The recipient address 442 can be identified or determined based on the information in a traffic packet, such as the traffic packet 202 of FIG. 2A, the packet information may include, for example, payload or header information with a sender's and recipient's Internet protocol (IP) address or other mobile address. The subscriber identifiers 457a-c can include unique subscriber identifier, which can be dynamically determined by a network processing unit (NPU), such as the NPU 263 of FIG. 2A, or may be based on other learned or known information about a subscriber device (not shown).

In alternative example embodiments, the subscriber identifiers 457a-c can include, for example, a unique serial number of a subscriber device, a temporary identification number in a roaming network, an international mobile subscriber identity (IMSI) associated with a global system for mobile communications (GSM) or universal mobile telecommunications system (UMTS).

The buffer 445a can include information relating to the subscriber 457a-c, such as classifiers 453a-1-453a-3 and 453b-1-453b-3, which may be subscriber-specific classifiers or a group of classifiers shared among subscribers. Classifiers 453a-1-453a-3 and 453b-1-453b-3 can include a multitude of information about the subscriber, for example, a rate limitation, type of service, rules or actions associated with the type of service, or other commonly known or hereafter developed subscriber information for use in a mobile communications network. In one example embodiment, the subscriber identifiers 457a-c may be associated with the same, similar, or different types of classifiers or number of classifiers 453a-1-453a-3 and 453b-1-453b-3. For example, a subscriber in a mobile communications network with subscriber identifier S1 457a, can have a first classifier 453a-1 that includes the type of service as being a premium level service, such as all voice calls receiving high-priority classification. Subscriber identifier S1 457a may have a second classifier 453b-1 that includes the counter values corresponding to a type of service.

In alternative example embodiments of the present invention, subscriber identifiers 457a-c and classifiers 453a-1-453a-3 and 453b-1-453b-3 can be combined to determine resources that can be used or needed by a certain subscriber or certain group of subscribers. The buffer 445a stores pointers to resources 448a-f, such that the hardware resources 448a-f can include pointers to counters located in a different network element being accessible to the buffer 445a. Additional information 443 may be stored in the buffer 445a as determined by a network operator or other subscriber information as may be useful for determining or storing for use in application statistics.

The buffer 445b can be the same buffer as the buffer 245a during a different stage of the buffer fill procedure. In an alternative example embodiment, the buffer 445b can be an exact replica of the buffer 445a, also located in a memory, such as the memory 235 in FIG. 2A. The buffer 245b can include the same information as stored in the buffer 245a, such as the recipient address 442, the subscriber identifiers 457a-c, the classifiers 453a-1-453a-3 and 453b-1-453b-3, and the additional information 443. In an example embodiment, the additional information 443 may include, for example, representations of subscribers or a subset of subscribers handled by a node in the mobile network. Continuing to refer to the present example embodiment, during a stage of the buffer fill procedure (as described in reference to FIG. 2B), the buffer 445b can replace the hardware resource pointers 448a-f with resource values 449a-f. The resource values 449a-f can include, for example, accounting information or billing information for a subscriber or service; alternatively, the resource values 449a-f can be hardware counter values. In replacing the resource pointers 448a-f with resource values 449a-f, the example embodiment optimizes the procedure and saves network resources without having to copy the buffer or stack multiple times. Alternatively, another example embodiment can include certain portions or entire buffers to be copied or relocated to other network elements.

Further example embodiments of the present invention may include a non-transitory computer readable medium containing instruction that may be executed by a processor, and, when executed, cause the processor to monitor the information, such as components or status, of at least a first and second network element. It should be understood that elements of the block and flow diagrams described herein may be implemented in software, hardware, firmware, or other similar medium determined in the future. In addition, the elements of the block and flow diagrams described herein may be combined or divided in any manner in software, hardware, or firmware. If implemented in software, the software may be written in any language that can support the example embodiments disclosed herein. The software may be stored in any form of computer readable medium, such as random access memory (RAM), read only memory (ROM), compact disk read only memory (CD-ROM), and so forth. In operation, a general purpose or application specific processor loads and executes software in a manner well understood in the art. It should be understood further that the block and flow diagrams may include more or fewer elements, be arranged or oriented differently, or be represented differently. It should be understood that implementation may dictate the block, flow, and/or network diagrams and the number of block and flow diagrams illustrating the execution of embodiments of the invention.

The teachings of all patents, published applications and references cited herein are incorporated by reference in their entirety.

While this invention has been particularly shown and described with references to example embodiments thereof, it will be understood by those skilled in the art that various changes in form and details may be made therein without departing from the scope of the invention encompassed by the appended claims.

What is claimed is:

1. A method for reporting resource values in a data plane of a line card of a node in a mobile network, the method comprising:
    notifying a resource manager of a buffer in the data plane containing subscriber information;
    filling the buffer with a resource pointer;
    replacing the resource pointer in the buffer with a corresponding resource value; and
    reporting contents of the buffer from the data plane of the line card of the node in the mobile network.

2. The method of claim 1 wherein reporting contents of the buffer includes transmitting the buffer or forwarding a pointer to the buffer to an external node.

3. The method of claim 1 wherein reporting includes copying the buffer into a traffic packet without modification.

4. The method of claim 1 wherein at least one of the notifying, filling, replacing, or reporting is performed asynchronously relative to activities of the resource manager.

5. The method of claim 1 wherein notifying the resource manager includes transferring the buffer to the resource manager or forwarding a pointer to the buffer to the resource manager.

6. The method of claim 1 wherein filling the buffer includes filling the buffer with information representing subscribers, the subscribers' corresponding provisioned service, and corresponding counter values.

7. The method of claim 1 wherein the notifying, filling, replacing, and reporting occurs at the data plane.

8. The method of claim 1 wherein the notifying, filling, and replacing occurs at the data plane, and wherein the reporting occurs at a control plane.

9. The method of claim 1 wherein the notifying and filling occur at the data plane, and wherein the replacing and reporting occur at a control plane.

10. The method of claim 1 wherein the notifying occurs at the data plane, and wherein the filling, replacing, and reporting occur at a control plane.

11. The method of claim 1 further comprising transmitting, to an acquiring application, at least one statistic relevant to at least one subscriber or set of subscribers, in a single transaction or flow of process invocation.

12. The method of claim 1 wherein the resource pointer is a hardware resource pointer.

13. An apparatus for reporting resource values in a mobile network, the apparatus comprising:
    a notification module configured to notify a resource manager of a buffer in a data plane containing subscriber information;
    a buffer fill module configured to fill the buffer with a resource pointer;
    a replacement module configured to replace the resource pointer with a corresponding resource value; and
    a reporting module configured to report the contents of the buffer from the data plane.

14. The apparatus of claim 13 wherein the reporting module is further configured to transmit the buffer or forward a pointer to the buffer to an external node.

15. The apparatus of claim 13 wherein at least one of the notification module, buffer fill module, replacement module, or reporting module is configured to operate asynchronously relative to activities of the resource manager.

16. The apparatus of claim 13 wherein the notification module is configured to transfer the buffer to the resource manager or to forward a pointer to the buffer to the resource manager.

17. The apparatus of claim 13 wherein the reporting module is further configured to report the buffer in a form of a traffic-packet.

18. The apparatus of claim 13 wherein the buffer fill module is further configured to fill the buffer with information representing indications of subscribers, the subscribers' corresponding provisioned service, and resource values corresponding to the services.

19. The apparatus of claim 13 wherein the notification module, buffer fill module, replacement module, and reporting module are configured to operate at the data plane.

20. The apparatus of claim 13 wherein the notification module, buffer fill module, and replacement module are configured to operate at the data plane and the reporting module is configured to operate at a control plane.

21. The apparatus of claim 13 wherein the notification module and buffer fill module are configured to operate at the data plane and the replacement module and reporting module are configured to operate at a control plane.

22. The apparatus of claim 13 wherein the notification module is configured to operate at the data plane and the buffer fill module, replacement module, and reporting module are configured to operate at a control plane.

23. The apparatus of claim 13 further comprising a transmission module, operably interconnected to the reporting module, configured to transmit, to an acquiring application, at least one statistic relevant to at least one subscriber or set of subscribers, in a single transaction or flow of process invocation.

24. A computer program product including a computer readable medium having computer readable instructions to report resource values in a mobile network, wherein the computer readable instructions when executed by a processor, cause the processor to:

notify a resource manager of a buffer containing subscriber information;
fill the buffer with a resource pointer;
in the buffer, replace the resource pointer with a corresponding resource value; and
report the buffer.

25. A method for reporting resource values in a data plane of a mobile network, the method comprising:
filling a buffer in the data plane with information representing indications of subscribers, the subscribers' corresponding services, and resource values corresponding to the services; and
reporting the buffer via the data plane.

26. The method of claim 25 wherein the resource values include accounting or billing records for subscribers or services.

27. The method of claim 25 wherein the resource values are hardware counter values.

28. The method of claim 25 wherein the information represents subscribers or subset of subscribers handled by a node in the mobile network.

29. The method of claim 28 wherein the node is a mobile packet core gateway.

30. The method of claim 28 wherein reporting the buffer includes transmitting the buffer to an external node.

31. The method of claim 28 wherein reporting the buffer includes copying the buffer into a traffic packet without modifications.

32. The method of claim 28 further comprising transmitting, to an acquiring application, at least one statistic relevant to at least one subscriber or set of subscribers, in a single transaction or flow of process.

33. An apparatus for reporting resource values in a data plane of a mobile network, the apparatus comprising:

a buffer fill module configured to fill a buffer with information representing subscribers, the subscribers' respective corresponding services, and corresponding resource values; and
a reporting module configured to report the buffer.

34. The apparatus of claim 33 wherein the resource values, accessible to the loading module include the subscribers' respective corresponding services and accounting records for respective subscribers or billing records for the respective subscribers.

35. The apparatus of claim 33 wherein the information represents subscribers or subset of subscribers handled by a node in a mobile packet core network.

36. The apparatus of claim 33 wherein the node is a mobile packet core gateway.

37. The apparatus of claim 33 wherein the reporting module is configured to copy contents of the buffer to a traffic packet without modification and transmit the traffic packet to an external node.

38. The apparatus of claim 33 wherein at least one of the buffer fill module or reporting module is further configured to perform asynchronously relative to activities of the resource manager.

39. The apparatus of claim 33 wherein the reporting module is further configured to copy the buffer into a traffic packet without modification.

40. A computer program product including a computer readable medium having computer readable instructions to report resource values in a data plane of a mobile network, wherein the computer readable instructions when executed by a processor, cause the processor to:
fill a buffer in the data plane with information representing subscribers, the subscribers' respective corresponding services, and corresponding resource values; and
report the buffer from the data plane.

* * * * *